(12) United States Patent
Tuthill et al.

(10) Patent No.: US 12,178,188 B2
(45) Date of Patent: Dec. 31, 2024

(54) ANIMAL BED

(71) Applicant: HEBE STUDIO LIMITED, Banbury (GB)

(72) Inventors: James Tuthill, Oxfordshire (GB); Johannes Paul, London (GB); Simon Nicholls, Northamptonshire (GB); William Windham, Oxfordshire (GB)

(73) Assignee: HEBE STUDIO LIMITED, Banbury (GB)

( * ) Notice: Subject to any disclaimer, the term of this patent is extended or adjusted under 35 U.S.C. 154(b) by 85 days.

(21) Appl. No.: 17/928,313

(22) PCT Filed: May 28, 2021

(86) PCT No.: PCT/EP2021/064381
§ 371 (c)(1),
(2) Date: Nov. 29, 2022

(87) PCT Pub. No.: WO2021/239964
PCT Pub. Date: Dec. 2, 2021

(65) Prior Publication Data
US 2023/0200349 A1    Jun. 29, 2023

(30) Foreign Application Priority Data
May 29, 2020    (GB) ..................................... 2008136

(51) Int. Cl.
*A01K 1/035*    (2006.01)
(52) U.S. Cl.
CPC ................... *A01K 1/0353* (2013.01)

(58) Field of Classification Search
CPC .............................. A01K 1/035; A01K 1/0353
See application file for complete search history.

(56) References Cited

U.S. PATENT DOCUMENTS

| | | | | |
|---|---|---|---|---|
| 5,144,911 A | * | 9/1992 | Moore | A01K 29/00 119/28.5 |
| 5,188,059 A | * | 2/1993 | Rice | A01K 1/035 119/28.5 |
| 7,530,326 B2 | | 5/2009 | Dunn et al. | |
| 2004/0134433 A1 | | 7/2004 | Holder | |
| 2020/0049183 A1 | * | 2/2020 | Zerillo | F16B 12/56 |
| 2020/0315130 A1 | * | 10/2020 | Woolf | A01K 1/035 |

FOREIGN PATENT DOCUMENTS

| | | |
|---|---|---|
| CN | 207720918 U | 8/2018 |
| EP | 2910116 A1 | 8/2015 |

OTHER PUBLICATIONS

International Search Report & Written Opinion, European Patent Office, PCT/EP2021/064381, Sep. 10, 2021, 10 pages.

\* cited by examiner

*Primary Examiner* — Joshua J Michener
*Assistant Examiner* — Henry Hooper Mudd
(74) *Attorney, Agent, or Firm* — Taft Stettinius & Hollister LLP; Stephen F. Rost

(57) ABSTRACT

A modular animal bed 1 comprising a base 3 that is attachable to any of a plurality of different toppers 5 that each have a different configuration, the base and each said topper carrying respective parts of a multi-part fastening mechanism 15 that can be fastened together to couple a selected one of said plurality of toppers to said base.

19 Claims, 9 Drawing Sheets

ANIMAL BED

This application is a U.S. national stage application under 35 U.S.C. § 371 of PCT International Application Serial No. PCT/EP2021/064381, which has an international filing date of May 28, 2021, designates the United States of America, and claims the benefit of GB Application No. 2008136.0, which was filed on May 29, 2020, the disclosures of which are hereby expressly incorporated by reference in their entirety.

FIELD

This invention relates to improvements to animal beds, particularly but not exclusively to beds for dogs. Arrangements embodying the teachings of the invention are described hereafter with particular reference to beds for dogs, but this should not be construed as being a limitation of the scope of the invention, as such arrangements could conceivably be used by a variety of different animals.

BACKGROUND

Animal beds, such as a dog bed for example, typically comprise a core and a removable cover for the core. A conventional floor-lying bed that is available from Omlet Ltd, Tuthill Park, Wardington, Oxfordshire OX17 1RR, United Kingdom is depicted in FIG. 1. This dog bed comprises a padded core and a removable outer cover that includes a peripheral bolster. The cover can be taken off the core for cleaning in a washing machine. Another type of previously proposed bed, also available from Omlet Ltd, is shown in FIG. 2. In this instance the bed also comprises a padded core and a removable outer cover that can be taken off the core for cleaning in a washing machine.

Whilst these beds are comfortable and practical, the principal disadvantage is that once a customer has decided to buy a particular type of bed, then they are effectively stuck with their choice. If a customer wants to change the bed, say from a bolstered bed to a bed with a flat upper surface, their only option is to purchase a new bed having the desired configuration. Another disadvantage is that whilst in some instances replacement covers can be purchased, if the core should be damaged (for example, excessively soiled or chewed) then the customer has no option but to replace the bed in its entirety. Either scenario is unnecessarily wasteful.

SUMMARY

To address such issues, it is proposed to provide, in an implementation of the teachings of the invention, a modular animal bed comprising a base that is attachable to any of a plurality of different toppers that each have a different configuration, the base and each said topper carrying respective parts of a multi-part fastening mechanism that can be fastened together to couple a selected one of said plurality of toppers to said base.

Advantageously, this arrangement allows customers to swap a topper having one configuration (for example, a bolstered blanket) for another (such as a bolster-less blanket, for example) without having to replace the base. This arrangement also enables customers to replace any one part of the bed that has become damaged and/or excessively soiled, without having to replace any other parts of the bed.

The multi-part fastening mechanism may comprise any of a number of different types of fastening mechanism, such as press studs (also colloquially known as: "snap fasteners", "snaps" or "poppers"), a hook-and-loop fastening mechanism (such as Velcro™), a plurality of buttons and cooperating button-holes, or a three-part mechanical fastener more commonly known as a "zipper", a "zip fastener" or a "slider". Such three-part mechanical fasteners, as is well known in the art, comprise two toothed tracks or spiral metal or plastic coils, each bordering one of two elements that are to be joined, and a piece that either interlocks or separates the tracks or coils when pulled.

Of these multi-part fastening mechanisms, a three-part mechanical fastener is particularly advantageous as such a fastener provides a robust, reliable and durable arrangement for coupling the topper to the base, as well as being relatively difficult for an animal to disconnect.

Whilst three-part mechanical fasteners provide advantages, a problem associated with the use of such fasteners is that the manufacturing tolerances are such that as the length of the fastener increases, so the likelihood of a first toothed part of a given three-part mechanical fastener being properly aligned with a second toothed part of another three-part mechanical fastener significantly reduces. This problem is particularly apparent between batches of fasteners, and is exacerbated when a customer attempts to attach a new topper to a base that has been purchased some time previously. For this reason, in one envisaged arrangement, it is preferred for the topper to be coupled to the base by means of a plurality of three-part mechanical fasteners. By employing a plurality of such fasteners, the length of any one fastener can be chosen so that the aforementioned alignment problems are mitigated.

In an envisaged implementation, each said fastener is no more than one metre in length. For example, each said fastener may be at least 20 cm in length and less than one metre in length, and more preferably less than 80 cm in length.

In one implementation the base comprises a plurality of peripheral walls that co-operate to define a base surface to which a said topper can be attached, said base surface being uppermost in use. A first part of said multipart fastening mechanism may be coupled to said base surface so as to extend around (preferably substantially all the way around) a periphery of said base surface. The first part of said multipart fastening mechanism may be coupled to said base surface so as to be spaced from said peripheral edge. A second part of said multi-part fastening mechanism may be coupled to each said topper so as to be spaced from a peripheral edge of a topper surface that is adjacent said base surface when the topper is attached to the base.

Preferably said first and second parts of said multi-part fastening mechanism lie between said base and said topper when said topper is attached to the base, so that access to said fastening mechanism is obscured.

In one arrangement said topper may comprise first and second surfaces, said second surface being adjacent said base surface when the topper is mounted on the base. The first and second surfaces may be coupled to one another by means of a coupling provided in the vicinity of said second part of said multi-part fastening mechanism. The coupling may be provided between said second part of said multi-part fastening mechanism and a peripheral edge of said topper. In another arrangement the second part of said multi-part fastening mechanism may be provided between said coupling and said peripheral edge. Preferably the said coupling is substantially continuous and extends around the entire periphery of the topper. The coupling may comprise a hem.

Another arrangement may comprise a flange extending from a surface of the topper that lies adjacent the base when the bed is in use, the flange extending towards the base and being positioned so as to at least partly obscure said multi-part fastening mechanism.

Preferably said plurality of three-part mechanical fasteners are arranged so as to form a substantially continuous multi-part fastening mechanism. In one implementation first parts of the fasteners each have a first end and a second end and may be arranged on said base so that a first end of a said fastener is in the vicinity of a second end of another said fastener, said first parts cooperating with second parts of the fasteners similarly arranged on a surface of said topper which lies adjacent the base when the bed is in use. Preferably regions of said first and second ends of adjacent fasteners partially overlap. In one arrangement, said multi-part fasteners may comprise three-part mechanical fasteners, a third part of each fastener that functions to join first and second parts thereof being at least partially hidden from view behind an adjacent fastener when the fasteners are closed.

In one implementation, regions of said topper may be cut away in the vicinity of each corner of said base to partly expose a surface of the base that lies uppermost when the bed is in use.

In one arrangement a support of a kit for converting a floor-lying animal bed into a raised animal bed may be insertable into said base, a plurality of legs being engageable with said support once the support has been inserted into the base to thereby raise the bed off a floor.

Another arrangement provides an animal bed comprising a base, and a topper that is affixable to the base, wherein the base comprises a plurality of sidewalls that cooperate to define a generally rectangular base first surface that forms the base's upper surface when the bed is in use, the topper comprising a generally rectangular topper first surface that forms the topper's underside in use; wherein the topper first surface has a larger surface area than the base first surface so that the topper partly overhangs the periphery of the base first surface when the topper is placed on the base, the topper being cutaway in the vicinity of each corner so that the topper lies substantially flat on the base when placed thereon.

A further implementation provides an animal bed comprising a base, and a topper that is affixable to the base, wherein the base comprises a first surface to which said topper can be affixed, said base first surface forming the base's upper surface when the bed is in use, the bed further comprising a plurality of three-part mechanical connectors, a first part of each said connector being coupled to said base first surface, a second part of each said connector being coupled to a topper first surface that forms the topper's underside in use, respective first and second parts of said mechanical connectors being arranged so that first and second parts of each said connector are aligned with one another when the topper is aligned with the base, said connectors each comprising a third part moveable with respect to associated first and second parts when said first and second parts are aligned and adjacent one another to couple the first and second parts together, and thereby couple the topper to the base.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
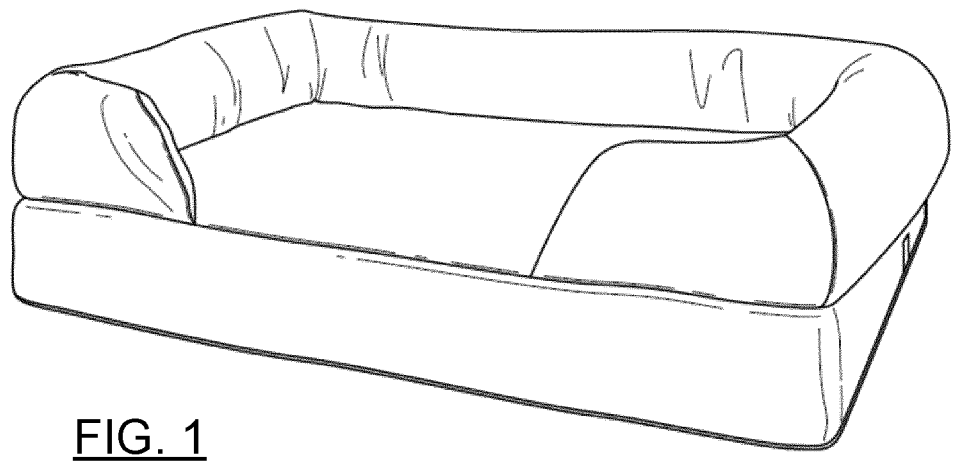
FIG. 1 is a schematic representation of a previously proposed bolstered animal bed.
Figure 2:
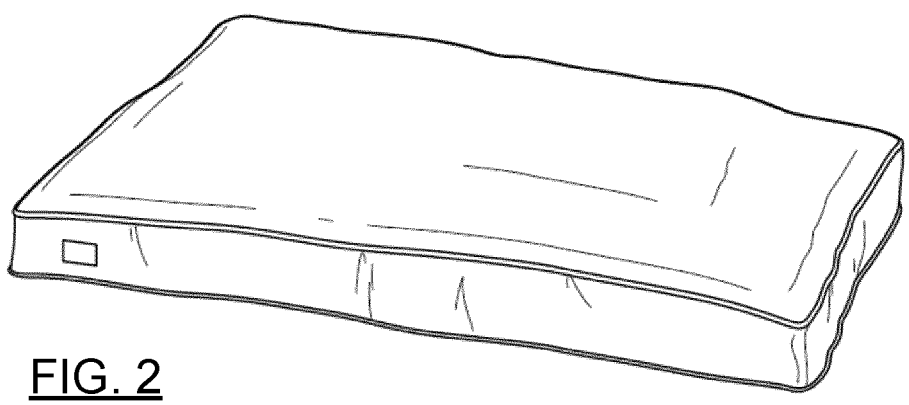
FIG. 2 is a schematic representation of a previously proposed non-bolstered animal bed.

As aforementioned, FIGS. 1 and 2 are schematic representations of previously proposed animal beds. In FIG. 1 the bed comprises a padded core (in this particular instance, of memory foam) that has a peripheral bolster extending partway around the periphery of the core. The core is then covered by means of a removable and washable cover. Similarly, in FIG. 2, the bed comprises a padded core (in this case, also of memory foam) that is provided within a removable and washable outer cover.

Figure 3:
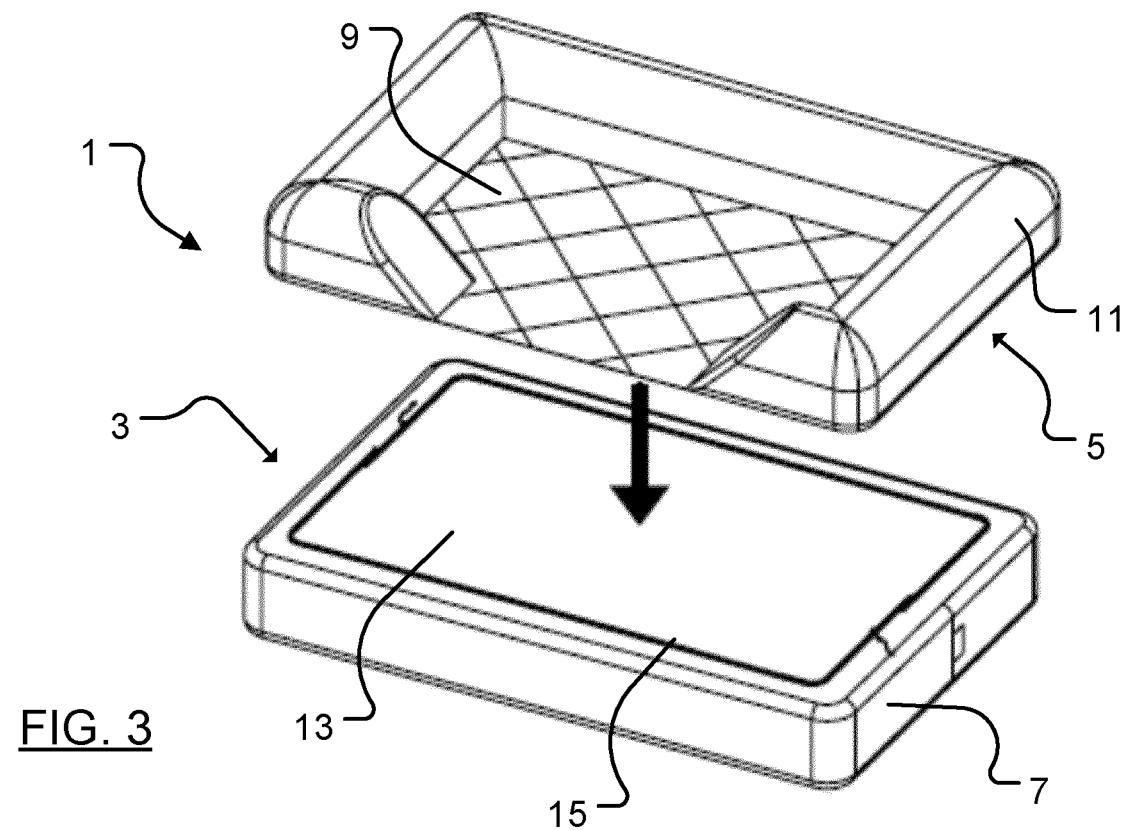
FIG. 3 is an exploded representation of the components of a modular animal bed.

Referring now to FIG. 3, the animal bed 1 of this arrangement comprises a base 3 to which a topper 5 can selectively be attached. The base comprises a core (not visible) over which a cover 7 (which may be removable for cleaning) has been fitted. The core is of any suitable material on which an animal can comfortably lie, for example memory foam.

The topper 5, in the depicted arrangement, comprises a panel 9 on which the animal will lie when the bed is in use, and a bolster 11 that extends partway around the periphery of the panel. The topper may be configured as a bolstered core with a removable cover (as per the base), or alternatively may be configured so that the entire topper can be placed in a washing machine for cleaning.

A surface 13 of the base 3 that is uppermost when the bed is in use is provided with one part of a multi-part fastening mechanism 15. A complementary part of the fastening mechanism (not visible) is provided on an underside of the topper panel 9, and is arranged so that the respective parts of the mechanism are brought together and aligned when the topper and base are brought together.

In the particular arrangement depicted in FIG. 3, the fastening mechanism comprises a three-part mechanical fastener more commonly known as a "zipper", a "zip fastener" or a "slider". Such three-part mechanical fasteners, as is well known in the art, comprise two toothed tracks or spiral metal or plastic coils, each attached one of two elements that are to be joined, and a piece that either interlocks or separates the tracks or coils when pulled.

In alternative envisaged arrangements, the multi-part fastening mechanism may comprise any of a number of different types of fastening mechanism, such as press studs (also colloquially known as: "snap fasteners", "snaps" or "poppers"), a hook-and-loop fastening mechanism (such as Velcro™), or a plurality of buttons and cooperating buttonholes.

As mentioned previously, due to increasing manufacturing tolerances with zipper length and the potential for misalignment, it is envisaged that the multi-part fastening mechanism may comprise a plurality of individual zippers, each having a length shorter than that at which manufacturing tolerances may lead to a misalignment of one zipper part with another. In the particular example illustrated, the multi-part fastening mechanism comprises two zippers, but in other arrangements more than two zippers may be employed. For example, FIG. 5 is an illustrative animal bed that is larger than the bed shown in FIGS. 3 and 4, and in this instance four zippers have been employed for coupling the topper to the base.

In envisaged arrangements, each zipper is less than a metre in length, preferably longer than 40 cm and less than a metre, and more preferably between roughly 40 and 80 cm in length.

In the arrangement depicted in FIG. 3, the zippers extend around substantially the entire periphery of the base surface 13. Whilst this arrangement is preferred, it will be appreciated that it is not essential, and that the zippers could only extend around a portion of the periphery of the base surface 13. The zippers also need not form a substantially continuous fastening mechanism, as illustrated, but could instead be separated from one another—for example, one zipper could lie adjacent one edge of the base surface and another zipper could lie adjacent an opposite edge of the base surface.

Figure 4:
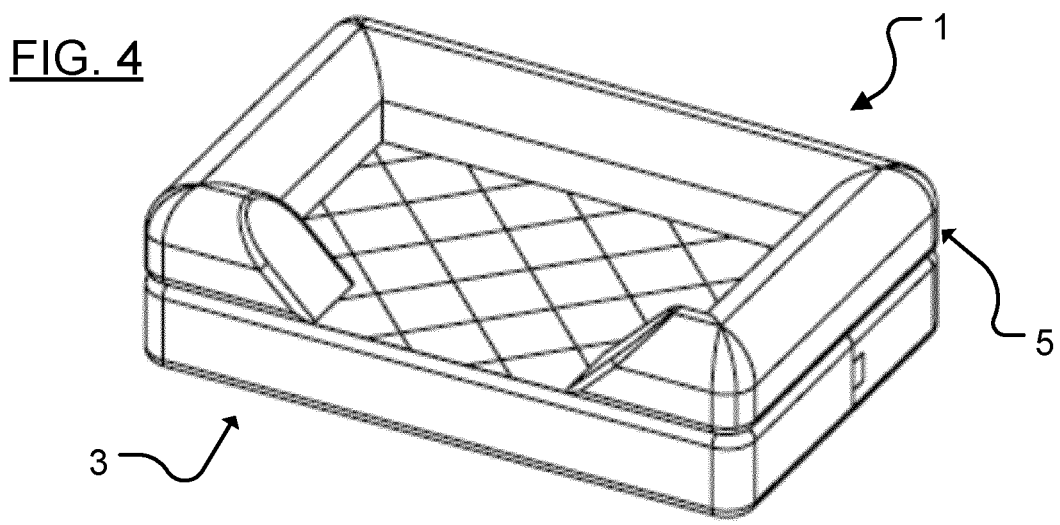
FIG. 4 is a schematic representation of an animal bed assembled from the components shown in FIG. 3.
Figure 5:
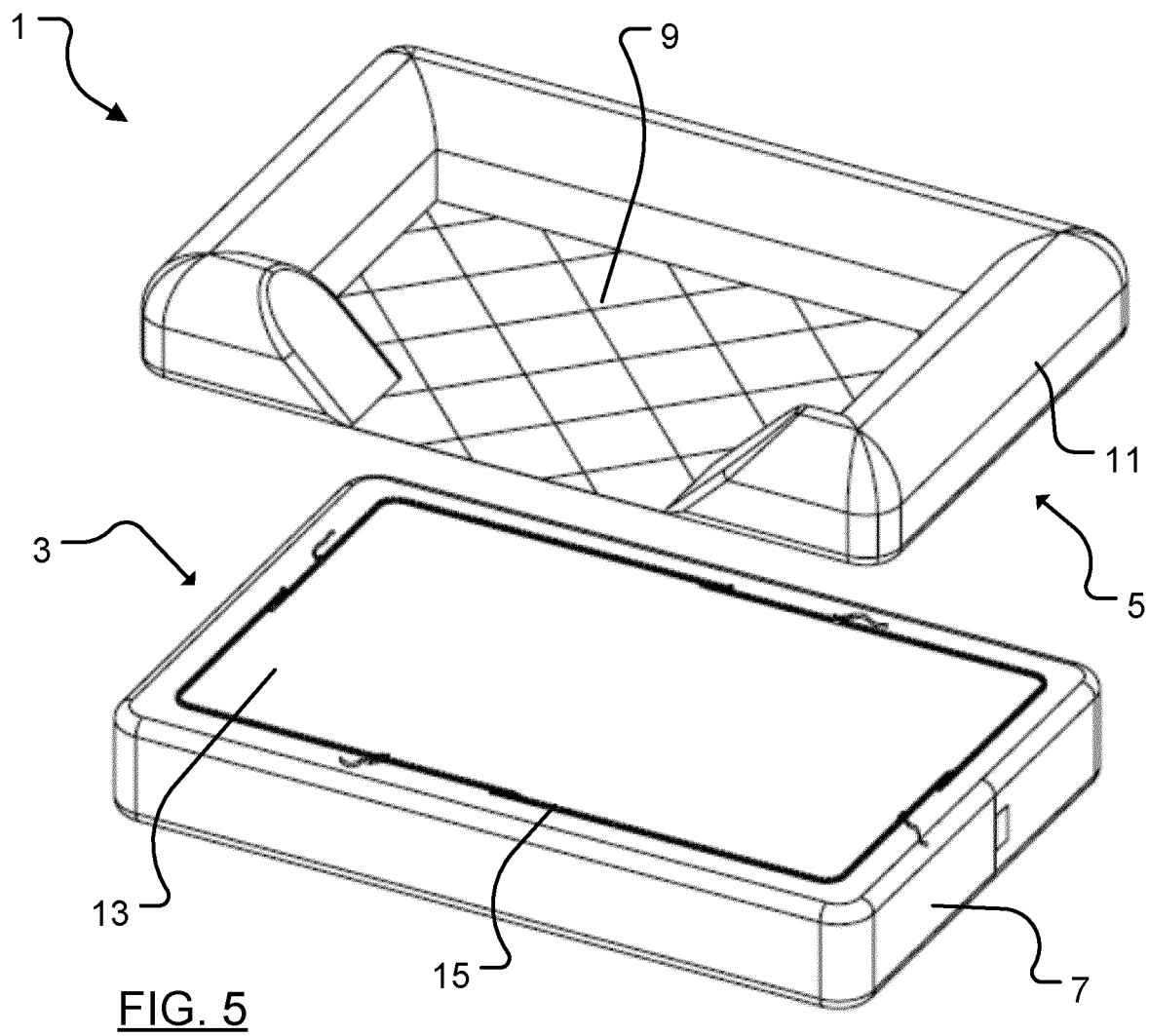
FIG. 5 is an exploded representation of the components of another modular animal bed.

As depicted in FIG. 4, with the topper 5 and base 3 aligned and respective parts of the fastening mechanism connected, the animal bed 1 is ready for use and has much the same appearance as a conventional animal bed of the type depicted in FIG. 1. However, unlike the bed of FIG. 1, in this instance the topper can be removed and replaced with another topper, of the same configuration or a different configuration. For example, the bolstered topper 5 depicted in FIG. 3 could be replaced with a bolster-less topper (not shown) that resembles a conventional cushion of the type shown in FIG. 2. In other implementations, the topper could be replaced with a bean bag or a simple blanket, and in all cases the topper will remain securely coupled to the base by means of the multi-part fastening mechanism.

A further advantage of the contemplated arrangement is that by enabling a topper to be attached to a base, the topper is raised off the floor, and this can help reduce the impact of draughts and other disturbances as compared, for example, with a conventional bed of the type depicted in FIG. 2.

Figure 6:
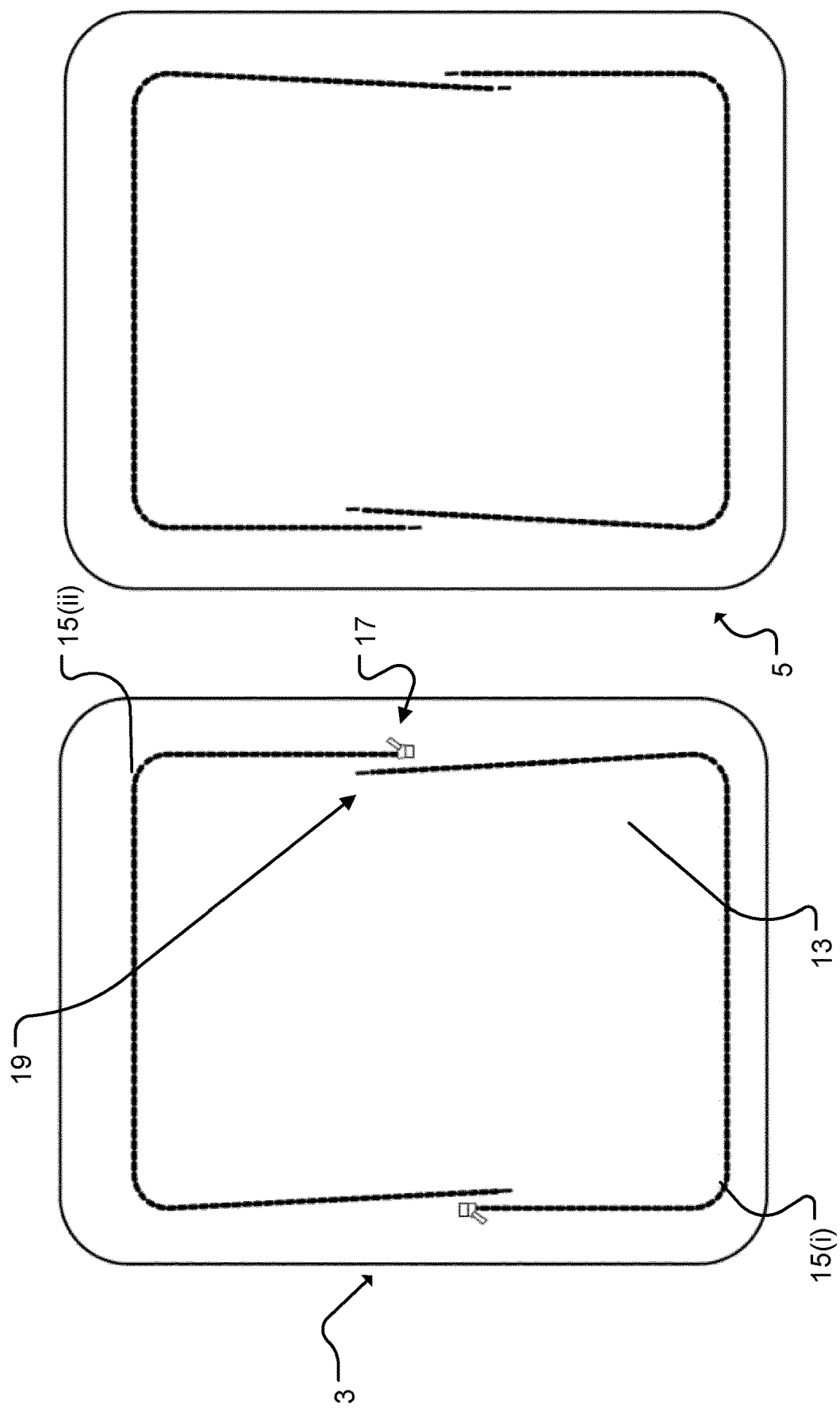
FIG. 6 is a schematic representation of the uppermost surface of an animal bed base (to the left of FIG. 6), and the underside of a complementary topper (to the right of FIG. 6)

Referring now to FIGS. 6, there are shown a schematic representation of the uppermost surface 13 of an animal bed base (on the left of FIG. 6), and a schematic representation of the underside of a complementary topper (on the right of FIG. 6).

In this particular implementation, two discrete zippers 15(*i*), 15(*ii*) are provided and respective parts of each zipper are coupled to the base and topper so as to align for zipping together when the topper and base are brought together.

As shown in FIG. 6, in preferred implementations the zippers that form the aforementioned multi-part fastening mechanism extend around the periphery of the base and topper surfaces so as to form a substantially continuous fastening mechanism. In the arrangement depicted, this is achieved by overlapping the start 17 of one zipper 15(*i*) with the end 19 of the other 15(*ii*)—more specifically by arranging the end of one said zipper to lie inside of the start of the other. This is advantageous for a number of reasons. Firstly, having a substantially continuous fastening mechanism means that it is less likely for toys, detritus or paws to get in between the topper and the base. Secondly, by overlapping the zippers so that the end of one zipper lies behind (as viewed from outside of the bed) the start of the other, the fastener pieces that are moved to interlock the respective parts of a given zipper are hidden behind the start of another zipper when the zipper is fully closed (as shown schematically in FIG. 7, where one zipper is almost closed and partially hidden behind the start of the other) and hence are less likely to be chewed or damaged by an animal who is using the bed.

Figure 7:
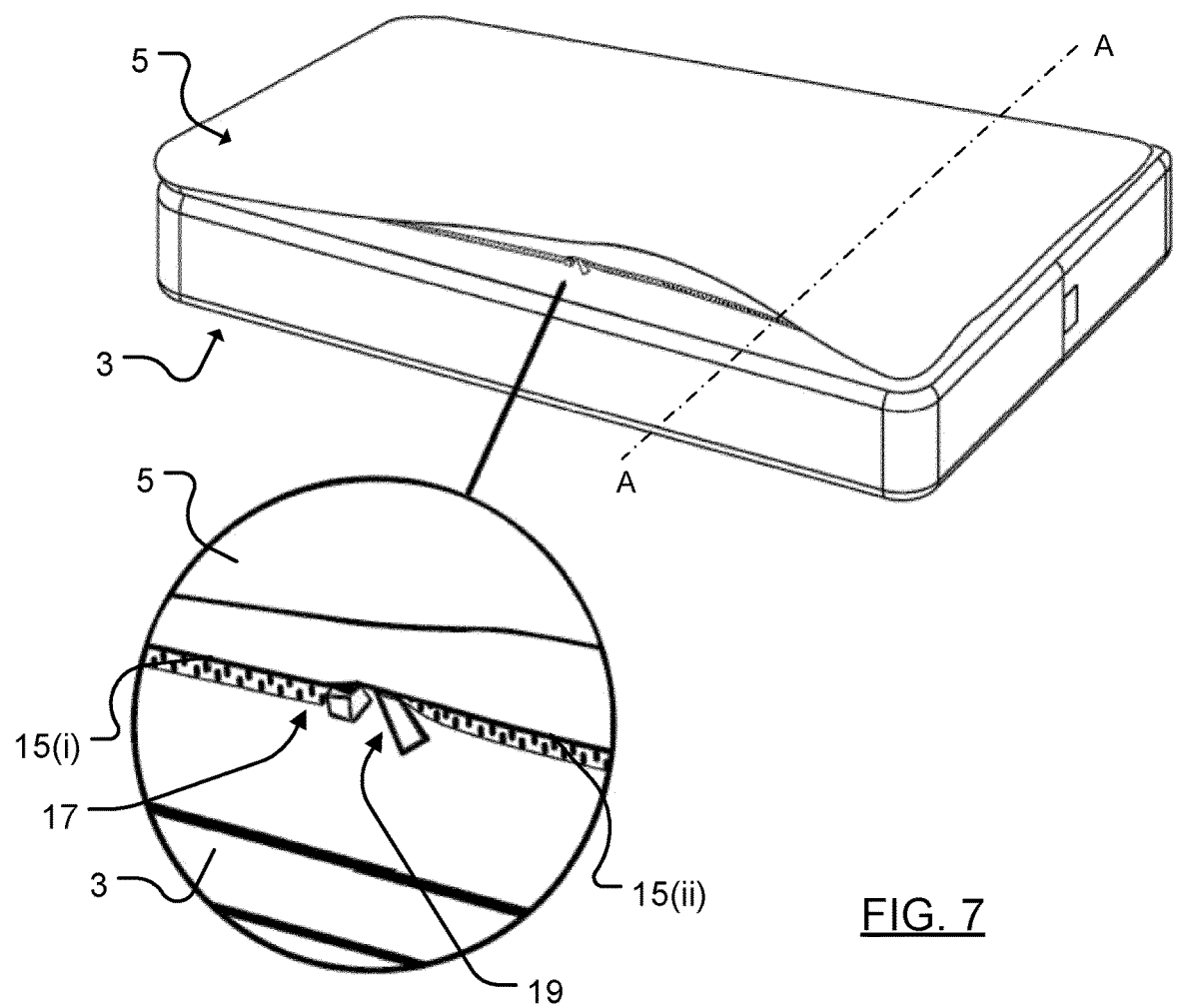
FIG. 7 is a schematic representation of an animal bed, and an enlarged view of a portion of that bed.
Figure 8:
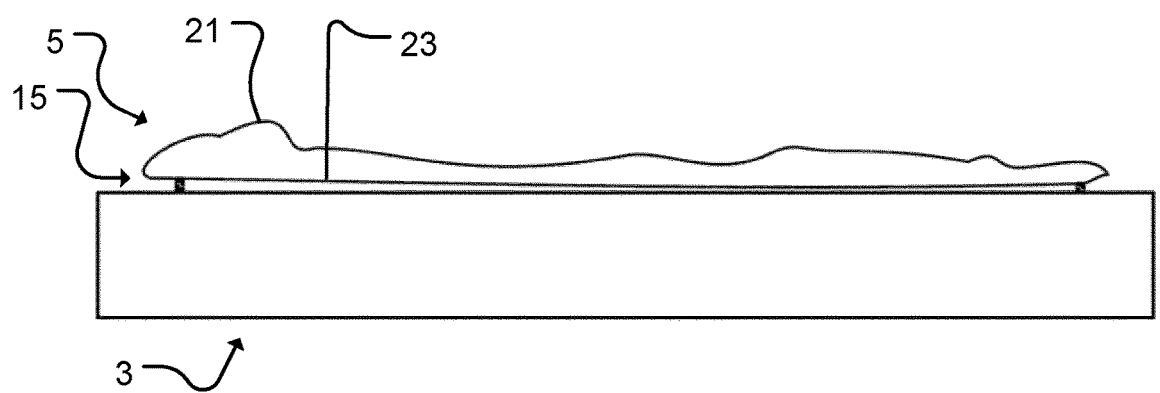
FIG. 8 is a schematic cross-sectional view of a bed along the line A-A of FIG. 7 after the bed has been used.

Referring now to FIG. 8 of the drawings, there is depicted a schematic cross-sectional view through the bed along the line A-A of FIG. 7, after the bed has been in use by an animal. The topper shown in FIG. 7 comprises upper 21 and lower 23 layers (and optionally a filling between those layers), and as only the lower layer 23 is secured to the base the upper layer can ruck up, as shown in FIG. 8, to expose at least part of the fastening mechanism (which comprises a zipper 15 in this particular case).

Figure 9:
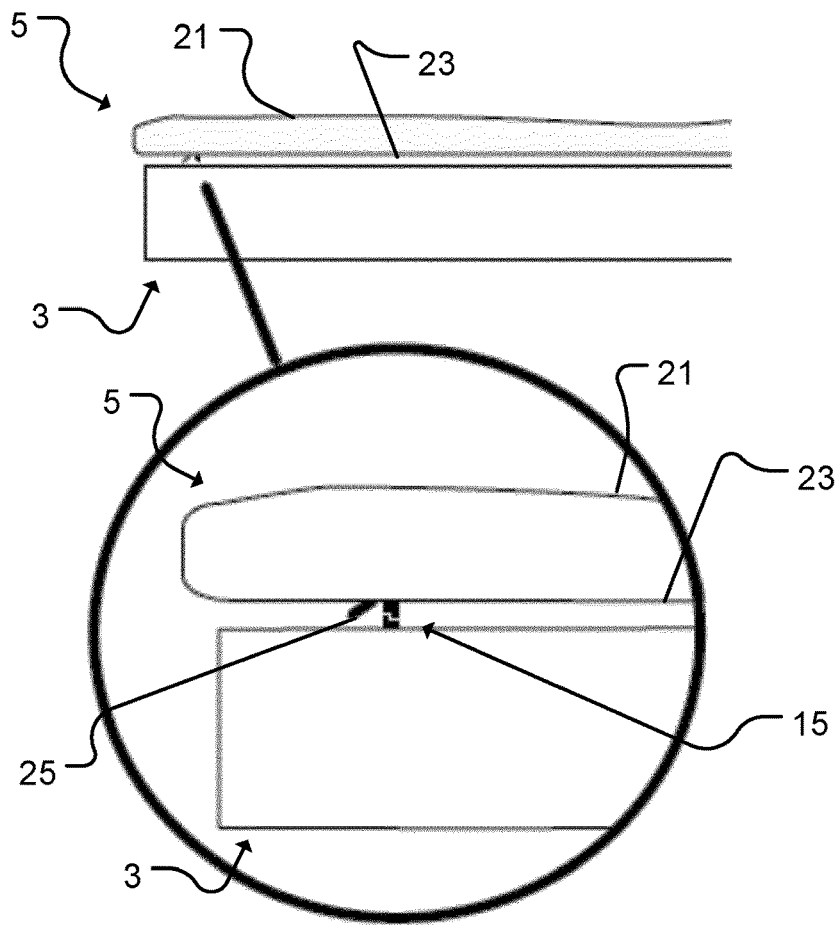
FIG. 9 is a cross-sectional view of part of an animal bed and an expanded view of an area thereof.
Figure 10:
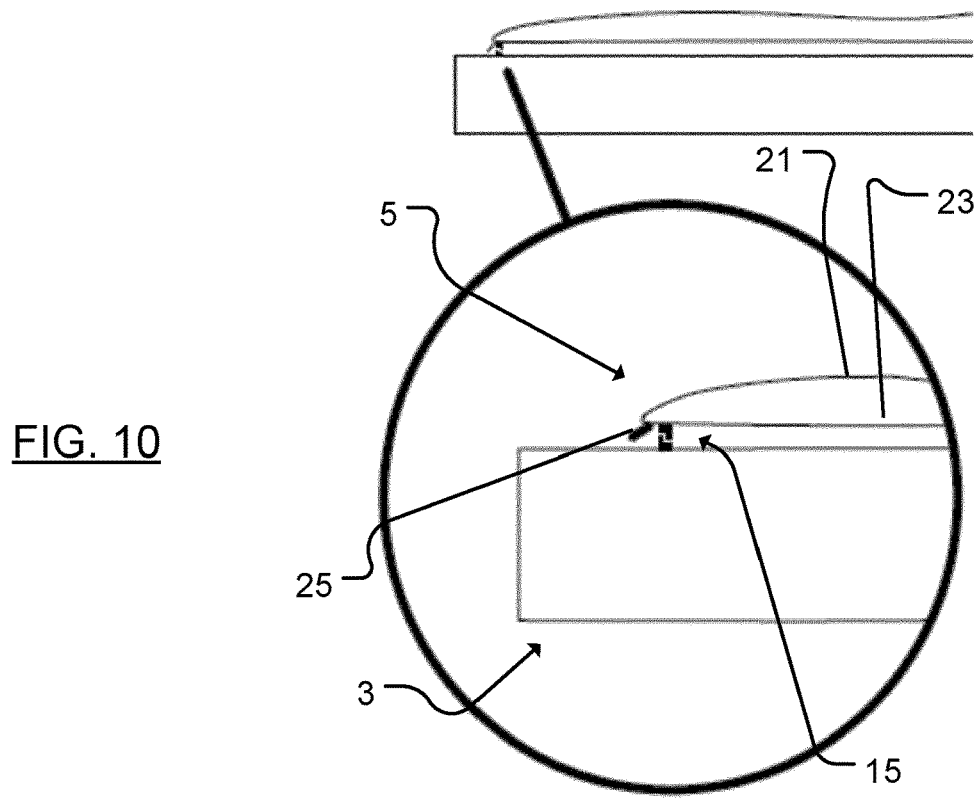
FIG. 10 is another cross-sectional view of the bed shown in FIG. 9.

To address this disadvantage it is proposed, as shown in FIG. 9, to provide a flange 25 that is located between the zipper 15 and the periphery of the topper 5 and extends outwardly from the aforementioned lower layer 23 (and towards the base when the topper is placed on the base) so that the zipper 15 (or other fastening mechanism) remains at least partially obscured from view if the topper should, as shown in FIG. 10, be rucked up in use.

It will be appreciated, that this aspect of the bed described herein is not limited solely to toppers of the type depicted in FIGS. 7 to 10, but equally to toppers of the type depicted in FIG. 3, where the flange would also function to obscure the fastening mechanism from view, and hence improve the aesthetic appeal of the bed.

In an envisaged arrangement the aforementioned flange extends around the entire periphery of the topper and is coupled to the lower layer 23 in between the fastening mechanism and the peripheral edge of the topper.

Figure 11:
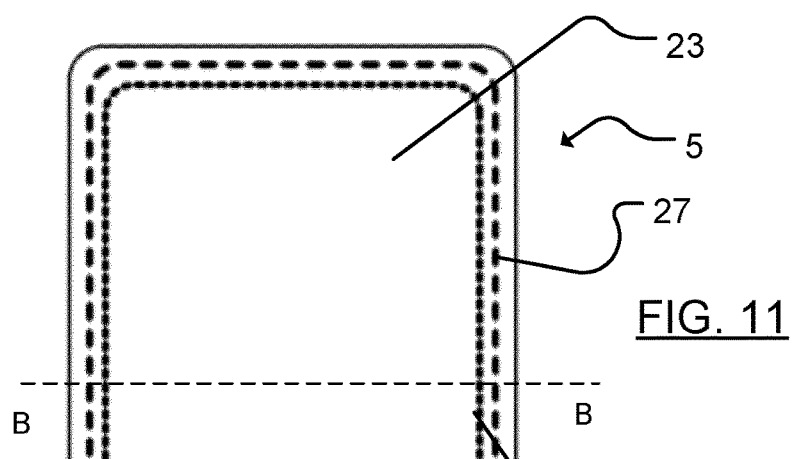
FIGS. 11 and 12 are schematic plan views of the underside of a topper.
Figure 12:
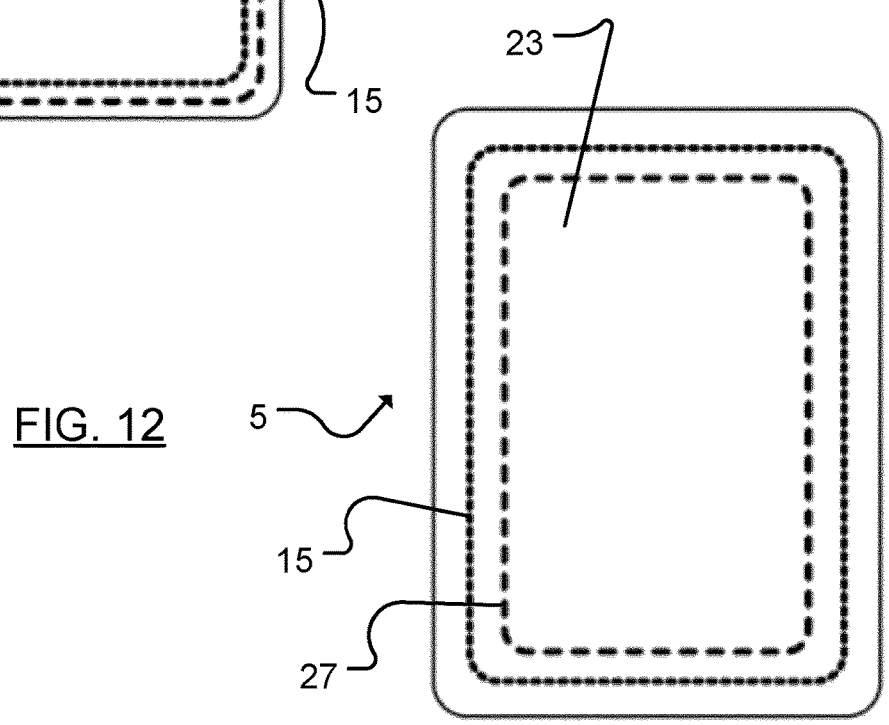

Another way (which may be employed in addition to or instead of the flange 25) of addressing the issue of the topper rucking up to expose the zip or other fastening mechanism is depicted schematically in FIGS. 11 and 12, which are each schematic plan views of the underside of a given topper (i.e. that side that will be adjacent the base when the topper is attached thereto).

Referring now to FIG. 11, in an envisaged arrangement the topper is provided with a coupling 27, such as a hem for example, that joins the upper 21 and lower 23 layers of the topper together. As depicted, in this particular arrangement, the coupling is continuous, extends around the entire periphery of the topper, and is located between the topper periphery and the fastening mechanism 15. In other envisaged arrangements, the coupling could be discontinuous (such as staples or other connectors placed at discrete intervals around the periphery of the topper) without adversely affecting the function of the coupling. Referring now to FIG. 12, in another arrangement, the coupling 27 may be located inside of the fastening mechanism. In all cases it is preferred for the coupling to be in relatively close proximity to the coupling 27.

Figure 13:
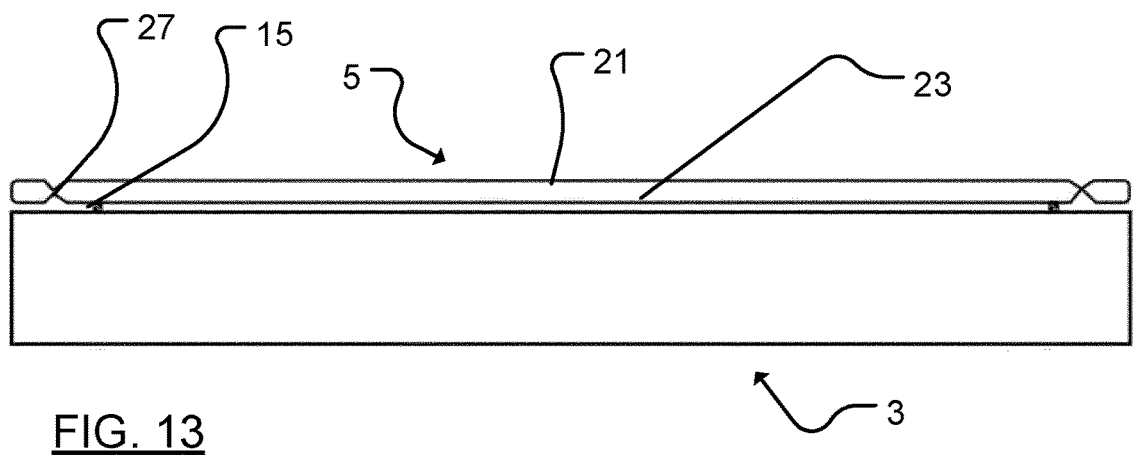
FIG. 13 is a schematic cross-sectional view through a topper of the type depicted in FIG. 11 (along the line B-B of FIG. 11) mounted on a base.

As will be appreciated from FIG. 13, which is a schematic cross-sectional view through a topper of the type depicted in FIG. 11 (along the line B-B of FIG. 11) mounted on a base, with such a coupling the likelihood of the fastening mechanism (in this instance a zip fastener) being exposed when the upper 21 layer is rucked up in use is significantly reduced, as the portion of the topper between the coupling and the topper periphery will tend not to ruck up, and thus will continue to obscure, at least partly, the fastening mechanism.

Figure 14:
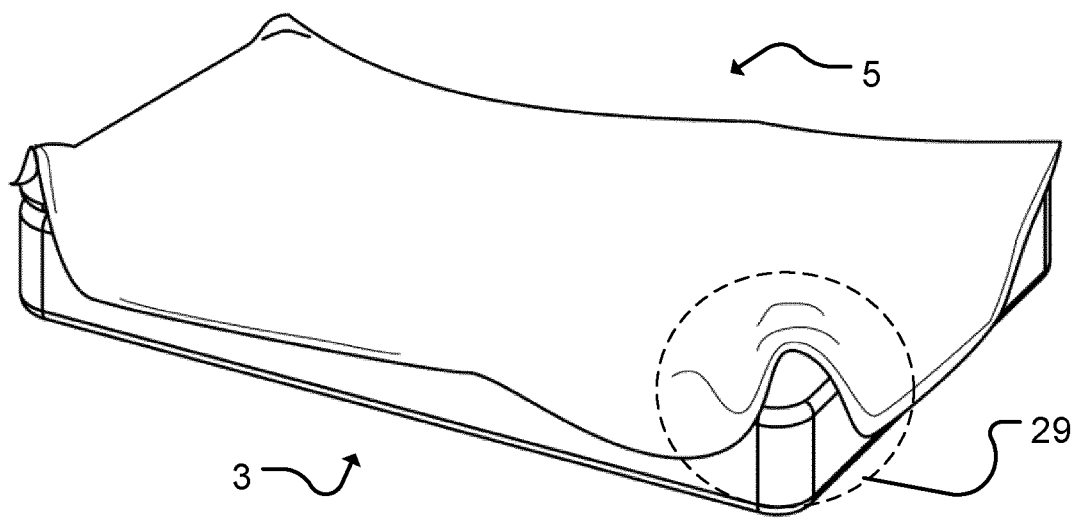
FIG. 14 is a perspective view of a previously proposed animal bed.

Referring now to FIG. 14, which is a schematic representation of an animal bed consisting of a topper 5 removeably attached to a base 3, another issue associated with animal beds is that a rectangular topper attached to a rectangular base (or, more generally, a topper that has the same shape as the base) that is intended to partly overlap the periphery of the base can tend to ruck up in the vicinity of the corners 29 of the topper, which rucking can spoil the look of the bed as well as providing the animal using the bed with a proud portion of topper for them to pull on and/or chew.

Figure 15:
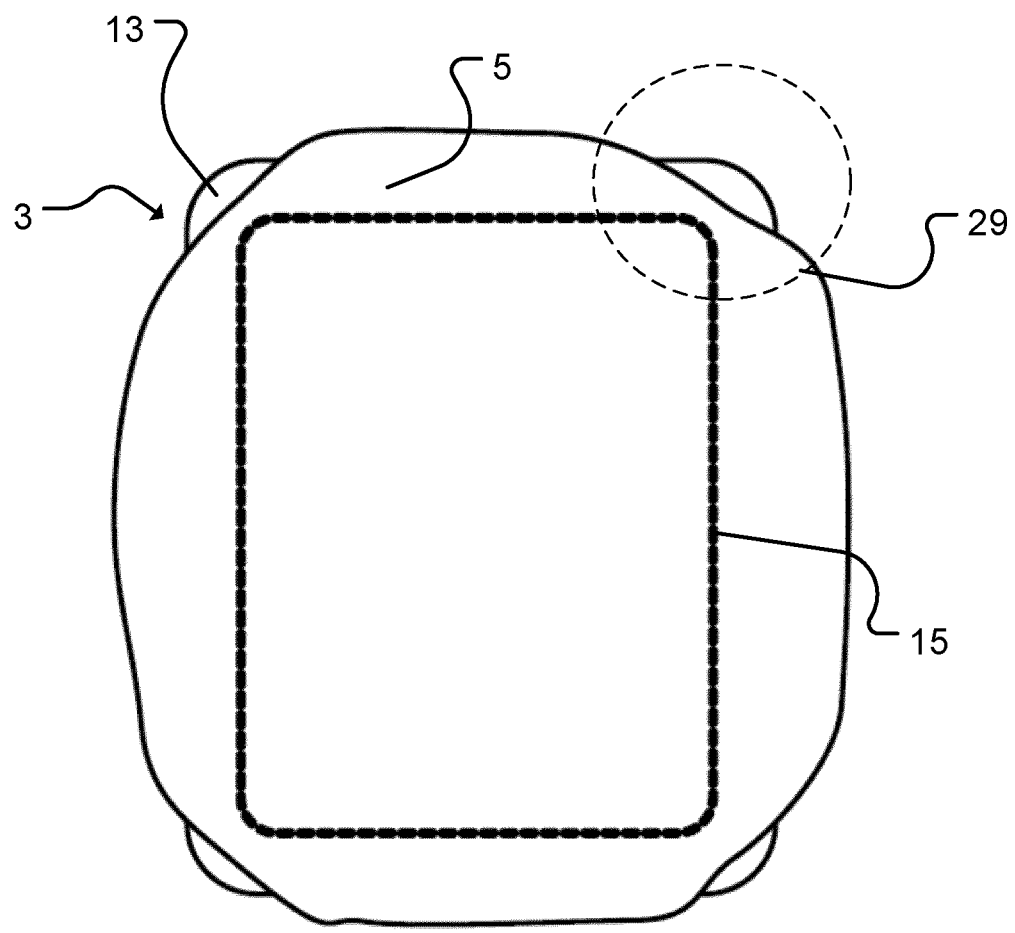
FIG. 15 is a plan view of an animal bed.

To address this issue, as shown in FIG. 15, which is a schematic plan view of an animal bed (showing the position of the fastening mechanism purely for illustration) it is proposed to cut-away the topper in the vicinity of the aforementioned corner regions 29, so that the topper lies substantially flat on the base.

As with other aspects disclosed herein, the features disclosed in FIG. 14 can be employed with or without other features described above. For example, a topper with cut-away corner portions could also include a coupling 27 and/or flange 25.

Figure 16:
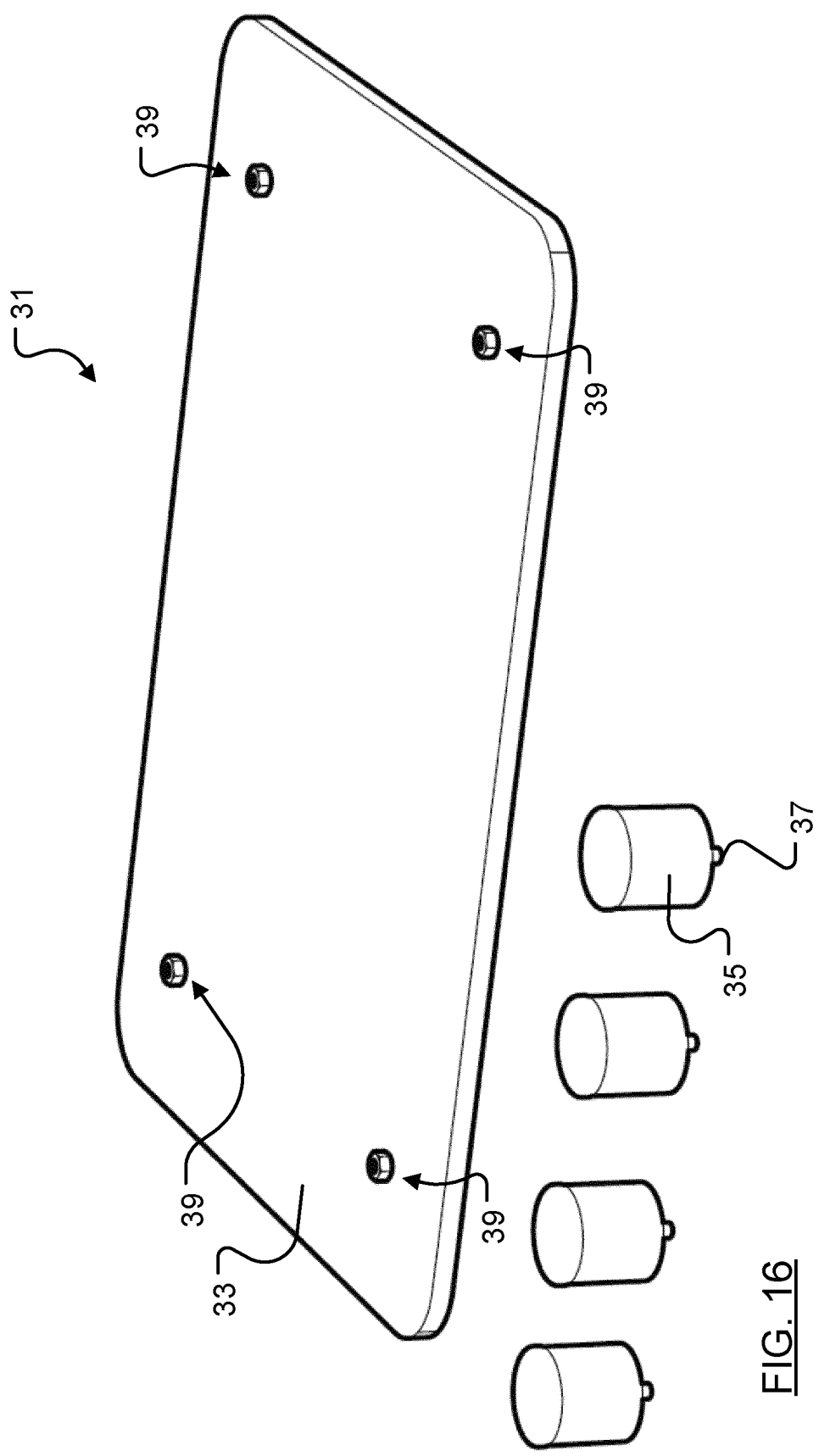
FIG. 16 is a schematic perspective view of an animal bed conversion kit.

Referring lastly to FIG. 16 of the drawings, the animal bed disclosed herein is well suited for use with a kit of the type described in co-pending UK patent application nos. 1907184.4 and 1911615.1, the contents of each of which are incorporated herein as though they were each reproduced herein in full.

The kit 31 depicted in FIG. 16, as is described in detail in the aforementioned co-pending patent applications, is for raising a floor-lying animal bed off the floor to thereby reduce draughts and disturbances for the animal. The kit comprises a support 33 that is insertable into the base so as to lie between a part of the base that will form the underside of the bed in use and the base cover. A plurality of legs 35 are associated with the support and each leg includes a fixing 37 that can be coupled with a complementary retainer 39 mounted in or attached to the support 33. For example, the fixings may comprise bolts and the retainers may comprise nuts (optionally captive nuts). In one envisaged arrangement the fixings may inserted through the cover of the base and engaged with the retainers. In another envisaged arrangement, the cover may be provided with eyelets that align with the retainers in the support when the support is inserted into the base, and in this case the fixings pass through the eyelets for engagement with the retainers.

It will be apparent from the foregoing that several improvements to animal beds are contemplated. As mentioned above, such improvements can be employed in isolation or in any combination to provide an enhanced animal bed.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst particular reference is made above to memory foam, it will be apparent to persons of skill in the art that a variety of other suitable materials exist. For example, the topper or base could be filled with polystyrene balls (for example of the type found in a bean bag), regular (non-memory) foam or pieces thereof, or conventional stuffing of the type found in a sofa, duvet or pillow.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A modular animal bed comprising a base that is attachable to any of a plurality of different toppers that each have a different configuration, the base comprising a plurality of peripheral walls that co-operate to define a base top surface to which a said topper can be attached, said base top surface being uppermost in use;
   wherein the base top surface and each said topper carry respective parts of a multi-part fastening mechanism that can be fastened together to couple a selected one of said plurality of toppers to said base;
   wherein said multipart fastening mechanism includes a plurality of three-part mechanical fasteners arranged so as to form a substantially continuous multi-part fastening mechanism; and
   wherein adjacent fasteners of the plurality of three-part mechanical fasteners are at least partially hidden from view behind an adjacent fastener when the plurality of adjacent fasteners are closed.

2. An animal bed according to claim 1, wherein each said three-part mechanical fastener being no more than one meter in length.

3. An animal bed according to claim 2, wherein each said three-part mechanical fastener is at least 20 cm in length and less than one meter in length.

4. An animal bed according to claim 1, wherein a first part of said multipart fastening mechanism is coupled to said base top surface so as to extend around a periphery of said base surface.

5. An animal bed according to claim 4, wherein said first part of said multipart fastening mechanism is coupled to said base top surface so as to be spaced from said base peripheral edge.

6. An animal bed according to claim 5, wherein a second part of said multi-part fastening mechanism is coupled to each said topper so as to be spaced from a peripheral edge of a topper surface that is adjacent said base top surface when the topper is attached to the base.

7. An animal bed according to claim 6, wherein said first and second parts of said multi-part fastening mechanism lie between said base and said topper when said topper is attached to the base, so that access to said fastening mechanism is obstructed.

8. An animal bed according to claim 7, wherein said topper comprises first and second surfaces, said second surface being adjacent said base top surface when the topper is mounted on the base, said first and second surfaces being coupled to one another by a coupling provided in the vicinity of said second part of said multi-part fastening mechanism.

9. An animal bed according to claim 8, wherein said coupling is provided between said second part of said multi-part fastening mechanism and a peripheral edge of said topper.

10. An animal bed according to claim 8, wherein said second part of said multi-part fastening mechanism is provided between said coupling and said peripheral edge.

11. An animal bed according to claim 8, wherein said coupling comprises a hem and is substantially continuous and extends around the entire periphery of the topper.

12. An animal bed according to claim 1, comprising a flange extending from a surface of a said topper that lies adjacent the base when the bed is in use, the flange extending towards the base and being positioned so as to at least partly obscure said multi-part fastening mechanism.

13. An animal bed according to claim 2, wherein each of said plurality of three-part mechanical fasteners include two toothed tracks or spiral or metal or plastic coils and a piece that interlocks or separates the tracks or coils when pulled.

14. An animal bed according to claim 13, wherein first parts of the three-part mechanical fasteners each have a first end and a second end and are arranged on said base so that a first end of a said three-part mechanical fastener is in the vicinity of a second end of another said three-part mechanical fastener, said first parts cooperating with second parts of the three part mechanical fasteners similarly arranged on a surface of said topper which lies adjacent the base when the bed is in use.

15. An animal bed according to claim 14, wherein a third part of each fastener that functions to join first and second parts thereof is at least partially hidden from view behind an adjacent fastener when the fasteners are closed, and wherein a region of a first end and a second end of adjacent three-part mechanical fasteners overlap.

16. An animal bed according to claim 1, wherein regions of said topper are cut away in the vicinity of each corner of said base to partly expose parts of the base top surface.

17. An animal bed according to claim 1, wherein a support of a kit for converting a floor-lying animal bed into a raised animal bed is insertable into said base, said kit further comprising a plurality of legs that are each engageable with said support once the support has been inserted into the base to thereby raise the bed off a floor.

18. A modular animal bed comprising a base that is attachable to any of a plurality of different toppers that each have a different configuration, the base comprising a plurality of peripheral walls that co-operate to define a base top surface to which a said topper can be attached, said base top surface being uppermost in use;
  wherein each said topper comprises a plurality of peripheral walls that co-operate to define a topper base surface that lies adjacent said base top surface when a said topper is attached to said base;
  the animal bed further comprising a plurality of three-part mechanical zip fasteners, a first part of each of said plurality of three-part mechanical zip fasteners being coupled to said base top surface, and a second part of each of said plurality of three-part mechanical zip fasteners being coupled to a said topper base surface, wherein said first and second parts are arranged so that each said second part of each of said plurality of three-part mechanical zip fasteners lies adjacent a said first part of each of said plurality of three-part mechanical zip fasteners when the topper base surface lies adjacent said base top surface to thereby enable said adjacent first and second parts to be coupled together by respective third parts of said plurality of three-part mechanical zip fasteners;
  wherein the first parts of said plurality of three-part mechanical zip fasteners are arranged around and in the vicinity of a periphery of said base top surface and the second parts of said three-part mechanical zip fasteners are arranged around and in the vicinity of a periphery of said topper base surface, the arrangement being such that said zip fasteners are hidden from view when said first and second parts are coupled together to fasten a said topper to said base;
  wherein first parts of the plurality of three-part mechanical fasteners each have a first end and a second end and are arranged on said base so that a first end of a said three-part mechanical fastener is in the vicinity of a second end of another said three-part mechanical fastener, said first parts cooperating with second parts of the three part mechanical fasteners similarly arranged on a surface of said topper which lies adjacent the base when the bed is in use; and
  wherein adjacent fasteners of the plurality of three-part mechanical fasteners are at least partially hidden from view behind an adjacent fastener when the plurality of adjacent fasteners are closed.

19. Modular animal bed comprising base that is attachable to any of a plurality of different toppers that each have a different configuration, the base comprising a plurality of peripheral walls that co-operate to define a base top surface to which a said topper can be attached, said base top surface being uppermost in use;
  wherein the base top surface and each said topper carry respective parts of a plurality of multi-part fasteners that can be fastened together to couple a selected one of said plurality of topper to said base;
  wherein said multipart fastening mechanism includes a plurality of three-part mechanical fasteners arranged so as to form a substantially continuous multi-part fastening mechanism;
  wherein first parts of the plurality of three-part mechanical fasteners each have a first end and a second end and are arranged on said base so that a first end of a said three-part mechanical fastener is in the vicinity of a second end of another said three-part mechanical fastener, said first parts cooperating with second parts of the three part mechanical fasteners similarly arranged on a surface of said topper which lies adjacent the base when the bed is in use; and
  wherein adjacent fasteners of the plurality of three-part mechanical fasteners are at least partially hidden from view behind an adjacent fastener when the plurality of adjacent fasteners are closed.

* * * * *